United States Patent [19]
Manabe

[11] Patent Number: 5,983,559
[45] Date of Patent: Nov. 16, 1999

[54] APPARATUS FOR CULTIVATING TURF BY HIGH-PRESSURE LIQUID INJECTION

[75] Inventor: Yuichiro Manabe, Kyoto, Japan

[73] Assignee: Marunaka Co., Ltd., Japan

[21] Appl. No.: 09/068,166

[22] PCT Filed: Sep. 6, 1996

[86] PCT No.: PCT/JP96/02556

§ 371 Date: May 4, 1998

§ 102(e) Date: May 4, 1998

[87] PCT Pub. No.: WO98/09495

PCT Pub. Date: Mar. 12, 1998

[51] Int. Cl.⁶ .......................... A01G 15/00; A01C 23/00; B05B 17/00
[52] U.S. Cl. .................. 47/1.7; 111/127; 239/1
[58] Field of Search ............... 47/1.7, 1.01; 111/127, 111/118; 239/754, 722; 56/400.04, 400.14

[56] References Cited

U.S. PATENT DOCUMENTS

| | | | |
|---|---|---|---|
| 4,272,022 | 6/1981 | Evans | 239/107 |
| 4,529,129 | 7/1985 | Ballu | 239/164 |
| 4,683,684 | 8/1987 | Yie | 51/429 |
| 4,793,557 | 12/1988 | Marchese et al. | 239/587 |
| 4,842,195 | 6/1989 | Koll et al. | 239/1 |
| 5,101,745 | 4/1992 | Podevels et al. | 111/127 |
| 5,119,744 | 6/1992 | Comer | 111/127 |
| 5,361,993 | 11/1994 | Andersson | 239/752 |
| 5,487,346 | 1/1996 | Taylor | 111/127 |
| 5,503,091 | 4/1996 | Foster et al. | 111/127 |

FOREIGN PATENT DOCUMENTS

| | | | |
|---|---|---|---|
| 1174763 | 3/1959 | France | 47/1.7 |
| 2708837 | 9/1978 | Germany | 47/1.7 |
| 5-302304 | 11/1993 | Japan . | |
| 7-67428 | 3/1995 | Japan . | |
| 923418 | 4/1982 | U.S.S.R. | 47/1.7 |

*Primary Examiner*—Thomas Price
*Assistant Examiner*—Fredrick T. French, III
*Attorney, Agent, or Firm*—Banner & Witcoff, Ltd.

[57] ABSTRACT

An apparatus for cultivating turf by high-pressure liquid injection comprises a plurality of frames 5 being arranged in parallel, a plurality of nozzles 2 being mounted on and along said frames 5 perpendicularly to the axis 5L thereof so as to be rotatable about the axes 5L of the frames 5 and to be positioned at two or more angles, and the nozzles 2 in two adjacent lines 2L being rotatable in opposite directions to each other. Since the liquid is applied obliquely to the surface E of the turf from two opposite directions, the soil grains are stirred to rotate and neither pressed nor moved in one direction, thereby to prevent formation of a compacted subsurface layer 7 in the soil.

6 Claims, 5 Drawing Sheets

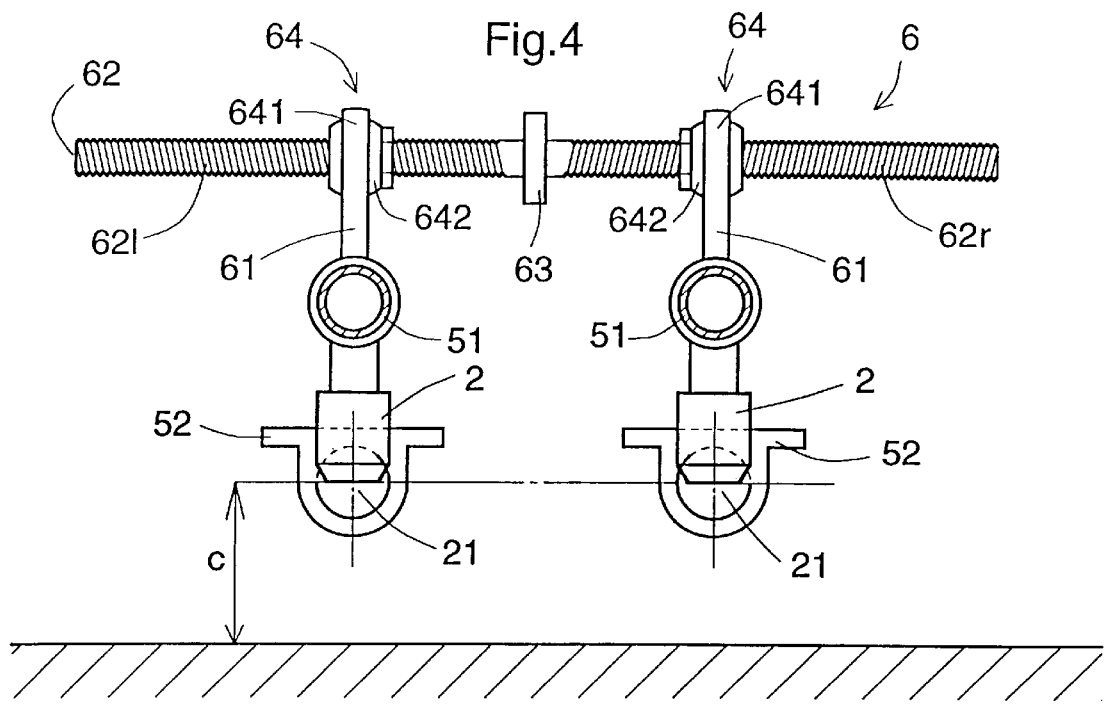
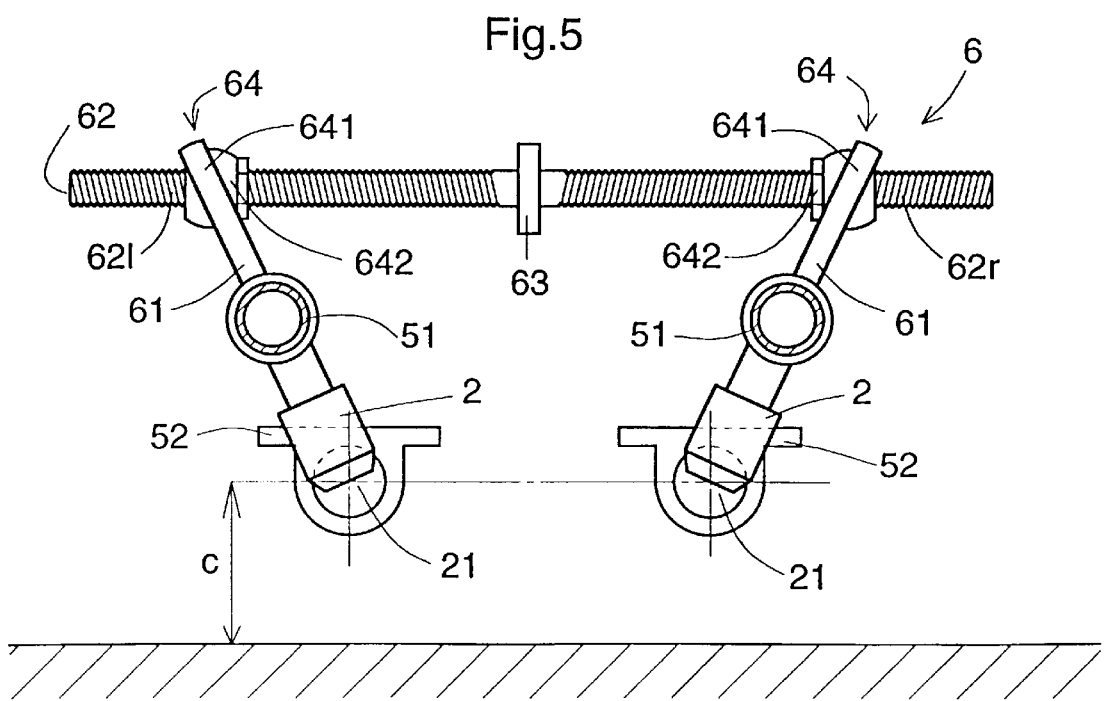

APPARATUS FOR CULTIVATING TURF BY HIGH-PRESSURE LIQUID INJECTION

TECHNICAL FIELD

This invention relates to an apparatus for cultivating turf and turf subsoil to fertilize, discharge chemicals to, or aerate the turf and turf subsoil by injecting high-pressure liquid intermittently into the turf.

TECHNICAL BACKGROUND

Operations such as fertilization and aerification are indispensable for maintenance of the turf at golf courses or other turf facilities. Aerification is used to lead air into the roots of the turf and assist the turf in growing. For example, a method of aerification has been developed, in which a lot of pores are formed under ground by jetting high-pressure water from nozzles toward the surface of the turf. As occasions demand, fertilizer or agricultural chemicals are mixed with the high-pressure water for simultaneous fertilization or application of the chemicals to the turf and turf subsoil.

A conventional apparatus for such purposes comprises a plurality of nozzles having output ports arranged toward the surface of the turf, a tank filled with liquid such as agricultural chemicals to be jetted from the nozzles, and a pump for pumping the liquid in the tank to each nozzle. With this apparatus, aerification, fertilization, discharging chemicals and the like are operated by moving the above-mentioned output ports of the nozzles along the surface of the turf and jetting the liquid from the nozzles intermittently.

DISCLOSURE OF THE INVENTION

In such a conventional apparatus, the angle of injection is always fixed, and the one with the angle perpendicular to the surface of the turf is often used. However, if injection is operated at a fixed angle to the turf all the time, the soil is compressed from above, so that a compacted subsurface layer is formed under the turf. After the compacted subsurface layer has been formed, even if the injection is operated, the compacted subsurface layer reflects the injected liquid in the direction of injection, preventing the liquid from penetrating into the soil, thereby to decrease the effect of fertilization or chemicals. Not only does the surface of the turf becomes uneven because the surrounding soil has been raised, but also a bad influence is brought to the growth of the turf because the water drainage of the soil has been reduced.

Adjustment of injection depth is also necessary to make chemicals act most effectively. For that purpose, the discharging pressure of the liquid has to be changed. However, as the pressure changes, the quantity discharged changes simultaneously. This burdens the operator with operations to control the moving speed of the nozzles, that is, the moving speed of the injection apparatus at all times to keep a proper quantity of discharging chemicals.

In order to solve the above-mentioned problem, in accordance with this invention, the liquid is jetted from two opposite directions thereby to prevent the soil from moving in one direction and being compressed to form a compacted subsurface layer. The injection depth also can be adjusted by changing the angle of injection without changing the discharging pressure of the liquid.

In accordance with this invention, an apparatus for cultivating turf by high-pressure injection of liquid is provided, which comprises a plurality of nozzles movable along the surface of the turf and having output ports oriented toward the surface of the turf; a tank filled with the liquid such as agricultural chemicals to be jetted intermittently from the nozzles; a pump for pumping the liquid in the tank to the nozzles; and which is characterized in that a plurality of frames are arranged in parallel, that the plurality of nozzles are mounted on and along said frames perpendicularly to the axes of the frames so as to be rotatable about the axes thereof and to be positioned at two or more angles, and that the nozzles on two adjacent frames are rotatable in opposite directions to each other.

With the above-mentioned apparatus, the following effects are achieved. It becomes possible to prevent formation of a compacted subsurface layer in the soil since it is possible to apply liquid obliquely to the surface of the turf from two opposite directions thereby to prevent the high-pressure liquid injected into the soil from compressing or moving the soil in one direction. At the same time, it becomes possible to keep a proper quantity of chemicals to be injected easily, and to make the operation simple and speedy without changing the moving speed of the nozzles, since it is possible to adjust the injection depth not by changing the discharging pressure of the liquid but by changing the angle of injection only. In these years environmental pollution caused by spreading a great amount of chemicals presents a big problem. A great effect on environmental conservation can be achieved because it is easy to keep a proper quantity of chemicals to be injected. Even if a compacted subsurface layer has already been formed, the liquid is prevented from reflecting in the direction of injection, so that it becomes possible to aerate, fertilize and discharge chemicals to the turf effectively. Moreover, it is easy to inject high-pressure liquid perpendicularly to the surface of the turf so as to fracture the compacted subsurface layer and recover the drainage ability of the soil because the angle of injection can be changed.

In order to eliminate mutual influences caused by the liquid jets simultaneously discharged from the nozzles in adjacent frames, such that the flowing speed of the liquid is reduced or the turf is raised or caves are formed because the liquid jets from the nozzles collide with each other in the soil, it is desirable that the apparatus comprises a distribution mechanism to jet the liquid from the nozzles in adjacent frames alternately with a phase difference of 180 degrees.

In order to stir the soil properly and improve aerification more effectively, it is preferable that the nozzles in the adjacent frames are arranged zigzag, so that the liquid jets from the nozzles in adjacent frames do not collide with each other in the soil but agitate the soil horizontally.

It is preferable that the center of rotation of each nozzle is adjacent to the output port at the tip of the nozzle, so that the distance between the output ports and the surface of the turf does not change even when the nozzles move. With this arrangement That is, as the position of the tips of the nozzles is not raised to make the pores formed by injection greater or the nozzles are not lowered to come into contact with the turf to damage it. And it becomes possible to keep the injection pressure in the soil constant all the time.

In order to have the centers of rotation of the nozzles adjacent to the output ports at the tips of the nozzles, it is contemplated that each said frame is shaped like a crankshaft which is supported rotatably about the axis of the frame, and that the nozzles are mounted on and along the pin portion of each said frame so that the output ports of the nozzles are located adjacent to the axis of the frame.

In order to make it possible to position the nozzles in adjacent frames at two or more angles of rotation, it is desirable that the apparatus comprises a positioning mechanism which can fix the pin portions of the adjacent frames shaped like a crankshaft at positions spaced a desired distance from each other.

BRIEF DESCRIPTION OF THE DRAWINGS

FIG. 4 is a sectional view taken along line X—X when the nozzles are vertical.

FIG. 5 is a sectional view taken along line X—X when the nozzles are slanted.

BEST MODES OF EMBODYING THE INVENTION

Figure 1:
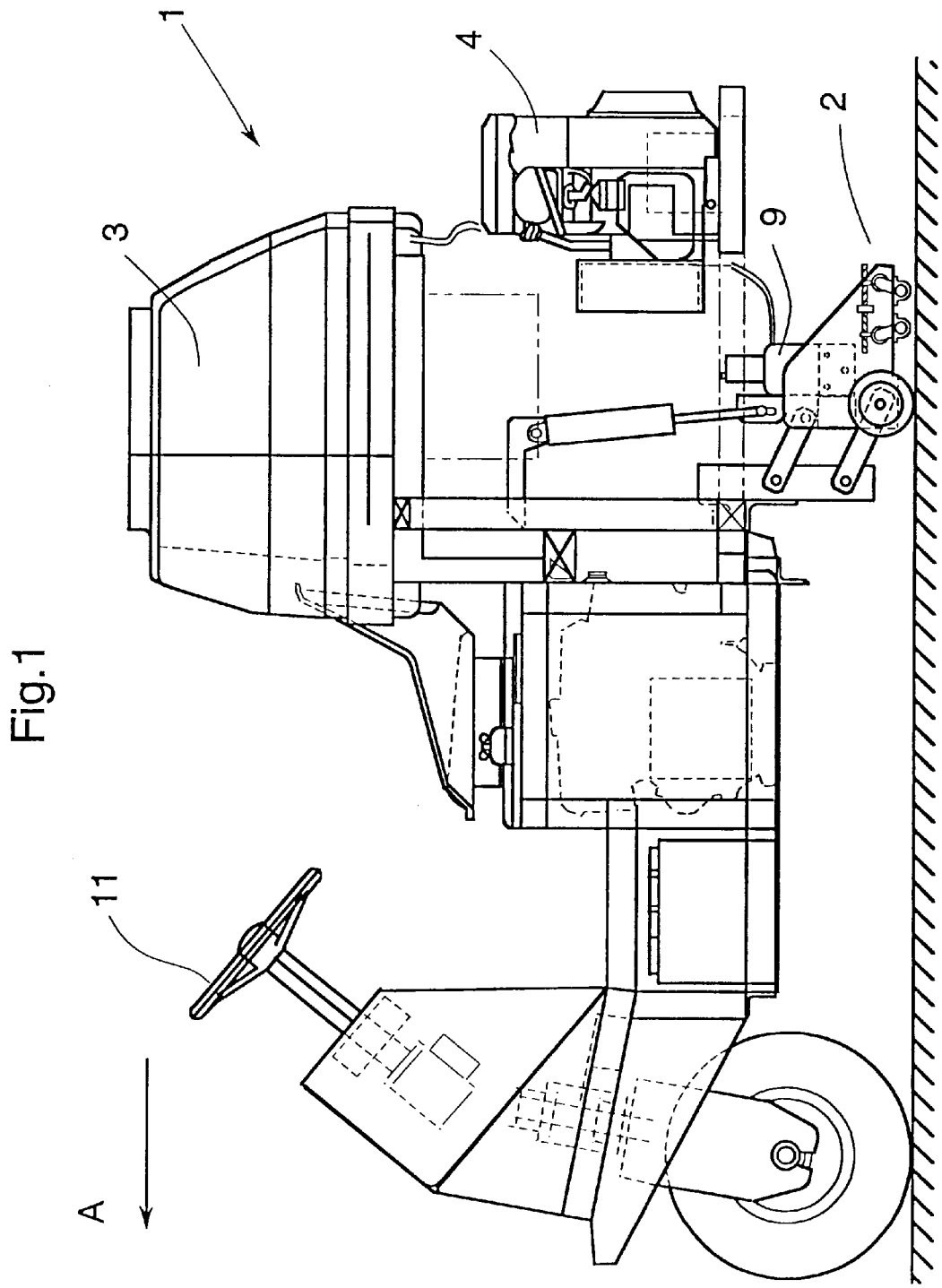
FIG. 1 is a side view showing one embodiment of the subsoil cultivator of the present invention.

FIG. 1 shows the whole arrangement of one embodiment of the invention. The apparatus 1 is provided with a plurality of nozzles 2 each having an output port oriented toward the surface of turf, a tank 3 filled with liquid, such as agricultural chemicals, which is to be jetted intermittently from the nozzles 2, and a pump 4 for pumping the liquid in the tank 3 into the nozzles 2.

The apparatus 1 is designed as a self-running vehicle and can be moved in the direction A by the driver operating a handle 11.

Figure 2:
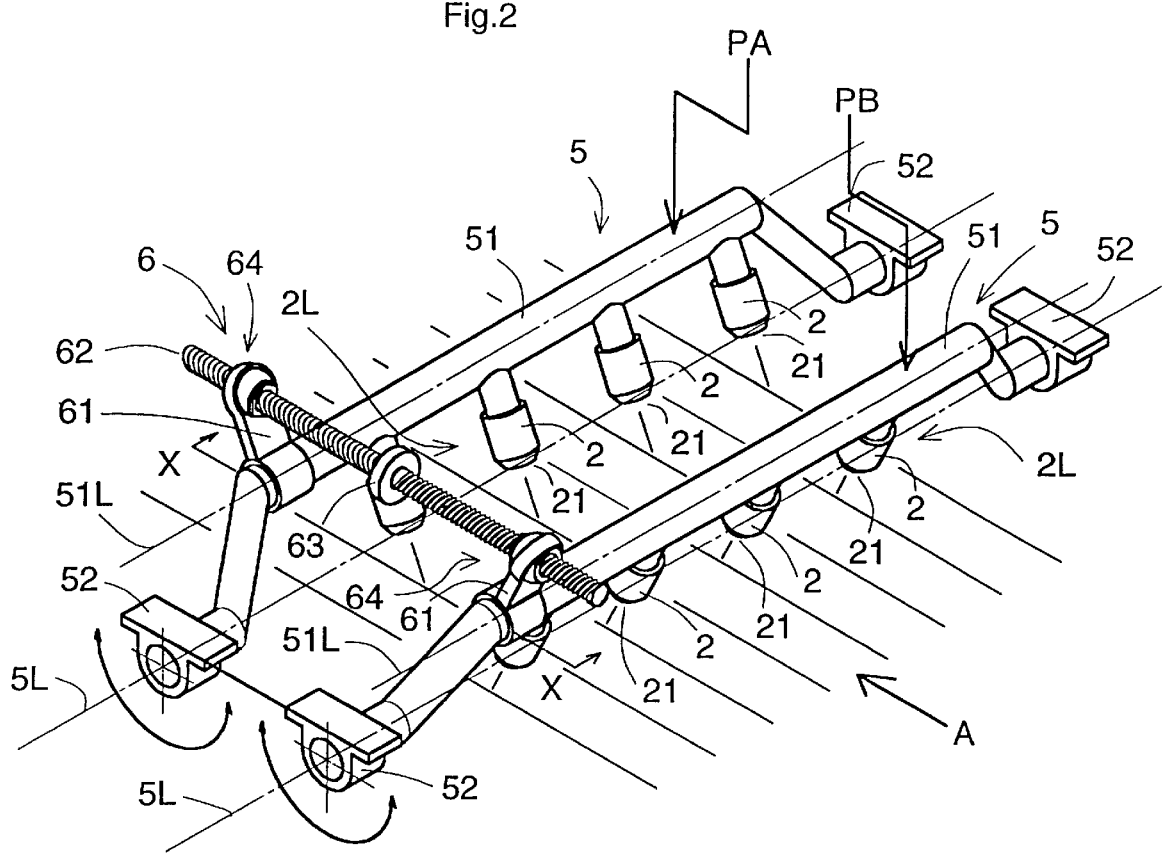
FIG. 2 is a perspective view showing the arrangement of the nozzles in the embodiment.

As shown in FIG. 2, the nozzles 2 are mounted on the pin portion 51 of each of two frames 5 shaped like a crankshaft perpendicularly to the axis 5L of the frame 5 and spaced along the length thereof. Each nozzle 2 has an output port 21 at the tip thereof. The output ports 21 of the nozzles 2 on each frame 5 are located substantially on the axis 5L of the frame 5 so that the nozzles 2 are rotatable about the respective output ports 21 as a center of rotation. The two frames 5 are arranged in parallel and held horizontally and extend perpendicularly to the moving direction A of the apparatus 1. The frames 5 are supported on the apparatus 1 at the opposite ends thereof by frame supports 52. The pin portions 51 of the two frames 5 are connected to each other by a positioning mechanism 6 so as to be able to be positioned at any distance from each other.

As shown in FIGS. 2, 4 and 5, the positioning mechanism 6 comprises a pair of arms 61, a pair of ball-joints 64 each of which is formed integrally with the arm 61 at the tip thereof and a shaft 62. Each of the arms 61 is fixed to one of the pin portions 51. Each of the ball-joints 64 comprises a generally spherical body 642 supported by a supporting body 641 formed with a central hole having a spherical inner surface into which the supported body 642 fits. The supporting body 641 supports the supported body 642 so that the body 642 is rotatable in said central hole the center line of which is perpendicular to the axis 51L. A hole having a female screw is bored through each supported body 642 perpendicularly to the axis 51L of the pin portion 51. The hole bored through one of the supported bodies 642 has a left female screw and the hole bored through the other supported body 642 has a right female screw. A left male screw 62*l* is formed on one half of the shaft 62 and a right male screw 62*r* is formed on the other half of the shaft 62. On the center of the shaft 62, there is formed a knob 63 for rotating the shaft 62. The left male screw 62*l* fits in the hole having the left female screw through the supported body 642, and the right male screw 62*r* fits in the hole having the right female screw through the other supported body 642. Through the action of the right and left screws, the distance between the two pin portions 51 is changed as the knob 63 is rotated, so that the frames 5 move in opposite directions to each other. Consequently, as shown in FIG. 5, the nozzles 2 in the line 2L and the nozzles 2 in the adjacent line 2L slant in opposite directions to each other to various angles at which the nozzles 2 can be fixed.

Figure 3:
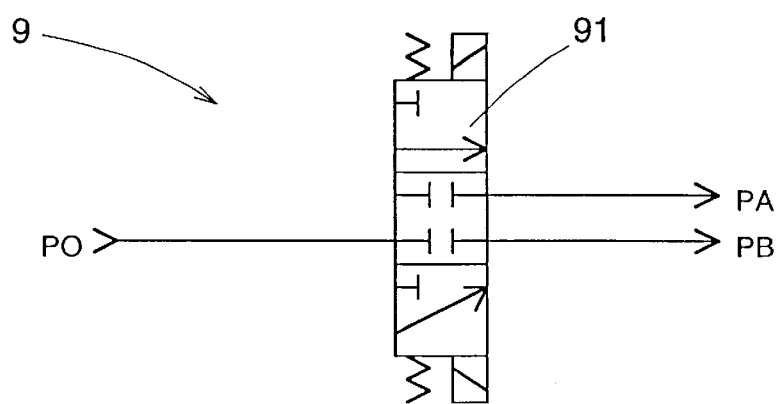
FIG. 3 is a hydraulic circuit diagram of the distributior.

As shown in FIG. 1, a distributor 9 is attached to the apparatus 1 so as to distribute and supply high-pressure liquid from the pump 4 to the nozzles 2 in each line 2L separately. As shown in the hydraulic circuit diagram of FIG. 3, this distributor 9 comprises ports PO, PA and PB and a directional control valve 91, which directs the high-pressure liquid supplied from the pump 4 to the port PO selectively to the port PA or the port PB. The port PA is connected to the nozzles 2 in one of the lines 2L, and the port PB is connected to the nozzles 2 in the other line 2L. An electro-magnetic valve is used for the directional control valve 91 so as to be able to operate the directional control valve 91 with electrical signals from outside.

In this embodiment, as shown in FIG. 2, the frames 5 serve as liquid supply pipes to the nozzles 2 in the lines 2L, and the nozzles 2 in the adjacent lines 2L are arranged zigzag.

The above-mentioned apparatus is operated as follows.

When the injecting operation is started, first the knob 63 is turned to adjust the angle of the nozzles 2 in each line 2L properly in such a direction that the output ports 21 of the nozzles 2 in the two lines 2L are directed to each other.

Figure 10:
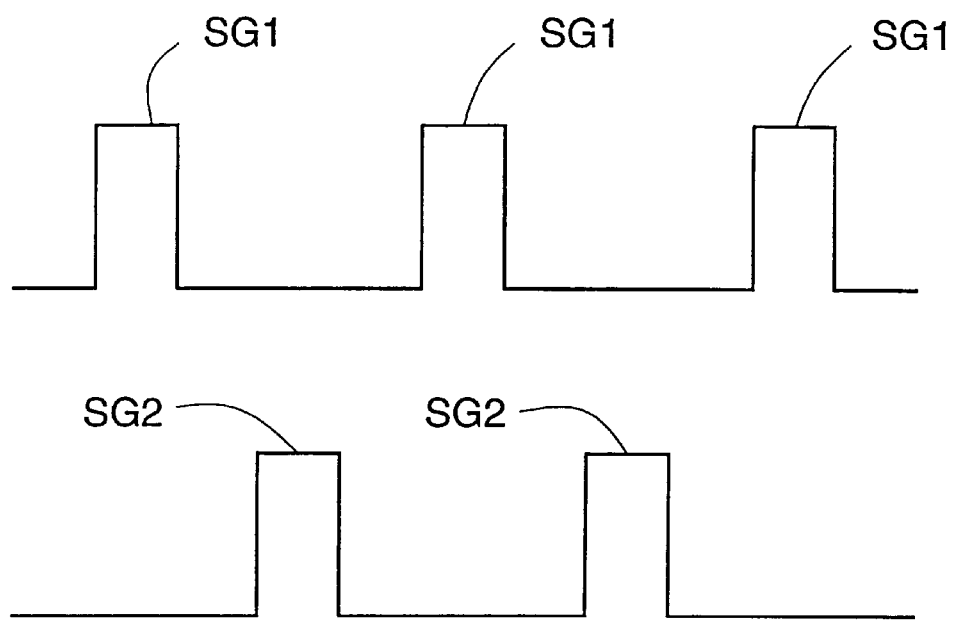
FIG. 10 is the wave form of the electrical signal for the directional control valve.

Then, as shown in FIG. 10, a signal SG1 which operates the directional control valve 91 to connect the ports PA and PO and a signal SG2 which operates the valve 91 to connect the ports PB and PO are applied to the valve 91 at a proper cycle for a proper period of time and with a phase difference of 180 degrees so that the liquid from the nozzles 2 in each line 2L can be jetted intermittently and alternately with a phase difference of 180 degrees.

Then, as shown in FIG. 2, the turf and turf subsoil are cultivated by moving the apparatus 1 on the turf in a direction A.

In this manner, the liquid is applied obliquely to the surface of the turf from two opposite directions and the nozzles in the two lines 2L are arranged zigzag, so that the soil grains are stirred to rotate and neither pressed nor moved in one direction, thereby to prevent formation of a compacted subsurface layer 7 in the soil. Moreover, since the liquid jets 8 from the nozzles 2 in two lines 2L are applied alternately with a phase difference of 180 degrees, it is possible to eliminate mutual influences, such that the liquid jets 8 collide with each other in the soil so that the flowing speed of the liquid 8 is reduced in the soil or the turf is raised or caves are formed. Besides, as shown in FIGS. 4 or 5, even if the angle of the nozzles 2 changes, the distance C between the output ports 21 and the surface E of the turf does not change. Therefore, since the position of the nozzle output ports 21 is not raised, it becomes possible to prevent the pores formed in the soil by injection from being enlarged and since the position of the nozzle output ports 21 is not lowered, it becomes possible to prevent the nozzle tips from coming into contact with the turf to damage it. And it becomes possible to keep the injection pressure in the soil constant all the time.

Figure 8:
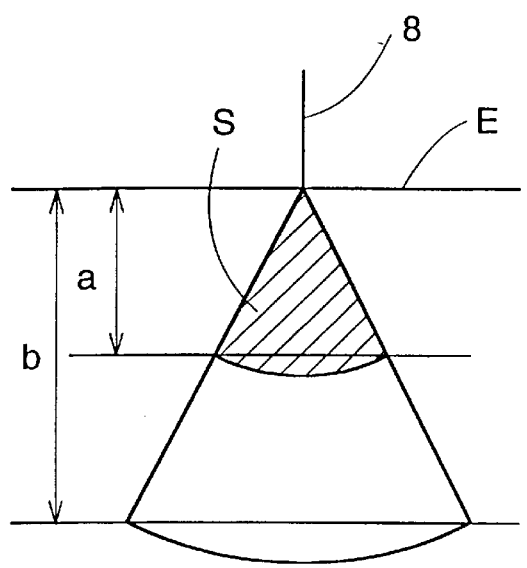
FIG. 8 shows the diffusing area of the liquid in the soil injected perpendicularly to the surface of the turf.
Figure 9:
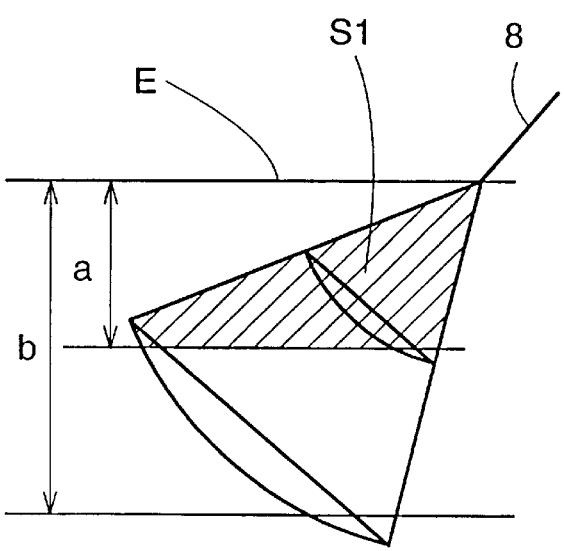
FIG. 9 shows the diffusing area of the liquid in the soil injected obliquely to the surface of the turf.

In case the discharging of chemicals is combined with the injecting operation, it is necessary to change the injection depth so as to make the chemicals act most effectively. As shown in FIG. 8, if the nozzles 2 are set perpendicularly to the surface E of the turf with a discharging pressure set to inject liquid into a depth b in the soil for aerification, only the portion of the chemical injected that occupies a hatched area S acts on harmful insects which usually nest in the area shallower than a depth a above the depth b. Therefore, not only the chemical injected deeper than the depth a are wasted, but also a more amount of chemical than is required has to be discharged, with resulting bad influence on the environment. With the conventional apparatus, to solve the problem the injection depth is changed to the depth a by reducing the discharging pressure of the jetted liquid 8. With the conventional arrangement, however, the discharged quantity per unit period of time is reduced so that it takes more time to inject the liquid, and it is necessary to decrease the moving speed of the apparatus 1 so as to keep a proper quantity of chemical to be discharged. Consequently, the operator is burdened with difficult operations for a long time. With this invention, however, the injection angle can be changed, so that only by changing the injection angle as shown in FIG. 9, it is possible to increase the amount of chemical effective on harmful insects to the amount corresponding to the area S1 bigger than the area S. In other words, it becomes possible to change the injection depth and make the chemical act efficiently only by changing the injection angle. And since it is unnecessary to reduce the quantity of the jetted liquid 8, there is no need to change the moving speed of apparatus 1, so that the operation becomes simple and speedy.

Figure 6:
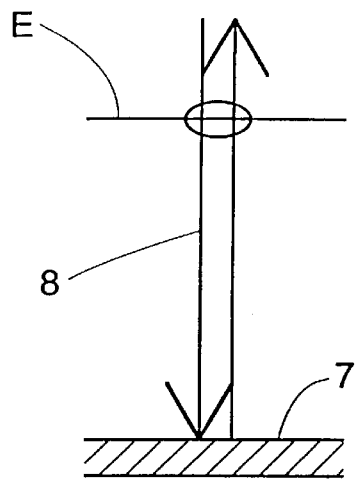
FIG. 6 shows the path of the liquid in the soil injected perpendicularly to the surface of the turf.
Figure 7:
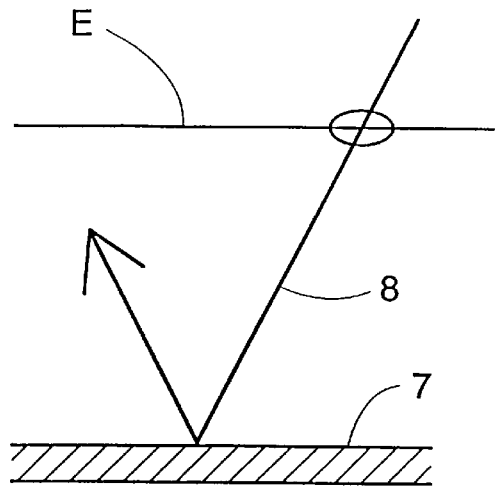
FIG. 7 shows the path of the liquid in the soil injected obliquely to the surface of the turf.

In case a compacted subsurface layer 7 has already been formed, with the conventional perpendicular injection as shown in FIG. 6, the compacted subsurface layer 7 reflects the injected liquid 8 in the direction of injection, and prevents the liquid 8 from penetrating into the soil. With this invention, since it is possible to inject the liquid 8 obliquely, as shown in FIG. 7, the compacted subsurface layer 7 neither reflects the injected liquid 8 in the direction of injection, nor prevents the liquid 8 from penetrating into the soil, fertilization or discharging chemicals can be operated effectively. Needless to say, the hard subsurface layer 7 can be fractured by perpendicular injection by raising the discharging pressure as in the conventional methods.

This invention is not limited to the above-mentioned embodiment, but there may be various modifications. For instance, the mechanism to cause the nozzles in two adjacent lines 2L to slant in opposite directions to each other may be driven by motors, and a link mechanism can take the place of the right and left screws. Three or more nozzle lines 2L can be used. The direction of arrangement of the nozzle lines 2L is not limited to being perpendicular to the moving direction A of the apparatus 1. The distribution mechanism 9 may comprise a different hydraulic circuit diagram including the directional control valve from the one shown in the embodiment. The directional control valve is not limited to the electrical type.

In addition, the other component sections of the apparatus are not limited to the ones shown in the figures. It is possible to modify the embodiment within the range which does not deviate from the purpose of this invention.

POSSIBILITY OF USE IN INDUSTRY

As described above, the apparatus for cultivating turf by high-pressure liquid injection in accordance with the invention is useful for fertilization, discharging of chemicals or aerification by injecting high-pressure liquid intermittently into the turf and turf subsoil without forming a compacted subsurface layer in the soil.

I claim:

1. An apparatus for cultivating turf by high-pressure liquid injection comprising;

a plurality of nozzles movable along the surface of the turf, and having output ports for orienting toward the surface of the turf;

a tank for containing a liquid to be jetted intermittently from the nozzles;

a pump for pumping the liquid from the tank to the nozzles;

a plurality of frames each having a longitudinal axis extending parallel to the longitudinal axis of an adjacent one of said plurality of frames; and each said nozzle being mounted on a respective one of said frames and extending perpendicularly relative to the longitudinal axis of said respective one of said frames so as to be rotatable relative to the longitudinal axis of said respective one of said frames and so that said nozzles are capable of being positioned at two or more angles, the nozzles on one of said frames being rotatable in a first direction and the nozzles on an adjacent one of said frames being rotatable in a second direction opposite said first direction, and a center of rotation of each nozzle being located substantially at the output port of the respective nozzle so that a distance between each said nozzle and the surface of the turf remains constant while the nozzles are rotated.

2. An apparatus for cultivating turf by high-pressure liquid injection according to claim 1, further comprising a distributor for providing a jetting cycle having a first phase during which liquid is jetted from the nozzles of only one of said two adjacent frames, and a second phase during which liquid is jetted from the nozzles of only the other of said two adjacent frames, said jetting cycle alternating between said first and second phases.

3. An apparatus for cultivating turf by high-pressure injection according to claim 1 and characterized in that the nozzles on one of the frames are offset from the nozzles on an adjacent one of said frames in a direction extending parallel to the longitudinal axes of said frames.

4. An apparatus for cultivating turf by high-pressure liquid injection according to claim 1, and characterized in that each said frame is shaped like a crankshaft and includes an elongated portion rotatably supported about the axis of the frame, and wherein the nozzles are mounted on and along said elongated portion of each frame so that the output ports of the nozzles are located substantially at the axis of a respective one of said frames.

5. An apparatus for cultivating turf by high-pressure liquid injection according to claim 4, further comprising a positioning mechanism for fixing the elongated portions of the adjacent frames at positions spaced a desired distance from each other.

6. An apparatus for cultivating turf by high-pressure injection according to claim 2, and characterized in that the nozzles on one of the frames are offset from the nozzles on an adjacent one of said frames in a direction extending parallel to the longitudinal axes of said frames.

* * * * *